United States Patent
Merkin

(10) Patent No.: US 7,788,717 B2
(45) Date of Patent: Aug. 31, 2010

(54) APPARATUS, SYSTEM, AND METHOD FOR SELECTIVELY ENABLING A POWER-ON PASSWORD

(75) Inventor: Aaron Eliahu Merkin, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 11/556,038

(22) Filed: Nov. 2, 2006

(65) Prior Publication Data

US 2008/0109893 A1 May 8, 2008

(51) Int. Cl.
*G06F 7/04* (2006.01)
(52) U.S. Cl. .................. 726/18; 713/183; 713/184; 713/150; 713/300; 710/302; 710/104
(58) Field of Classification Search .................. 726/18; 713/183–184, 150, 300; 710/302, 104
See application file for complete search history.

(56) References Cited

U.S. PATENT DOCUMENTS

| | | | | |
|---|---|---|---|---|
| 5,375,243 A | * | 12/1994 | Parzych et al. ............... | 726/17 |
| 6,442,640 B1 | * | 8/2002 | Eby et al. .................... | 710/305 |
| 6,968,414 B2 | | 11/2005 | Abbondanzio et al. ...... | 710/301 |
| 6,976,112 B2 | | 12/2005 | Franke et al. ................ | 710/302 |
| 2003/0033348 A1 | | 2/2003 | King et al. ................... | 709/201 |
| 2003/0226004 A1 | | 12/2003 | Abbondanzio et al. ......... | 713/1 |
| 2004/0103180 A1 | | 5/2004 | Brown et al. ................. | 709/223 |
| 2004/0128560 A1 | | 7/2004 | Challener et al. ............ | 713/202 |

OTHER PUBLICATIONS

Savaglio, RJ, Realtime Level Referencing, IBM Technical Disclosure Bulletin, May 1984, p. 6283, Burlington.

* cited by examiner

*Primary Examiner*—Thanhnga B Truong
*Assistant Examiner*—Angela Holmes
(74) *Attorney, Agent, or Firm*—Kunzler Needham Massey & Thorpe

(57) ABSTRACT

An apparatus, system, and method are disclosed for selectively enabling a power-on password. A password module stores the power-on password for a blade server. A test module determines if a power-on policy is satisfied. An access module grants access to the blade server if the power-on policy is not satisfied. If the power-on policy is satisfied, the access module may deny access to the blade server until the power-on password is received. In one embodiment, the power-on policy is satisfied if the blade server is removed from a first blade enclosure and inserted in a second blade enclosure.

14 Claims, 6 Drawing Sheets

APPARATUS, SYSTEM, AND METHOD FOR SELECTIVELY ENABLING A POWER-ON PASSWORD

BACKGROUND OF THE INVENTION

1. Field of the Invention

This invention relates to power-on passwords and more particularly relates to selectively enabling a power-on password.

2. Description of the Related Art

Blade servers are often used to provide processing power in data processing systems. Blade servers are typically configured as servers with one or more processors, memory, and the like. In addition, a blade server may be configured for easy insertion to and removal from a blade enclosure. For example, a blade server may be configured as circuit board and/or circuit module with connectors for connecting to the blade enclosure. One or more blade servers may reside within the blade enclosure.

The blade server is designed to be easily removed from and connected to the blade enclosure. In some cases, the blade server may be configured for hot swapping, wherein the blade server may be removed from and/or connected to the blade enclosure while the blade enclosure is powered on.

The blade enclosure may provide power, cooling, communications connections, and the like for the blade server. For example, the blade server may communicate with a network and one or more storage subsystems through the blade enclosure. The blade server may receive processing tasks over the network such as a command to search a database. In addition, the blade server may access the database on a storage subsystem through blade enclosure.

A blade server may perform the functions of a standalone server. For example, the blade server may include a storage device such as a hard disk drive and may store data independently of storage subsystems. However, the blade server is typically remotely and automatically managed, so that an administrator may not directly access the blade server.

Unfortunately, proprietary data that may be stored on the blade server can be stolen if a malicious user removes the blade server without authorization from a first blade enclosure and installs the blade server in a second blade enclosure. A power-on password may disable a blade server until the power-on password is entered so that the malicious user may not steal data by stealing the blade server. Unfortunately, the power-on password makes the blade server difficult to manage and deploy, particularly in data centers using large numbers of blade servers.

SUMMARY OF THE INVENTION

From the foregoing discussion, there is a need for an apparatus, system, and method that selectively enable a power-on password. Beneficially, such an apparatus, system, and method would enable the power-on password when conditions warrant while disabling the power-on password when not needed to simplify management of the blade server.

The present invention has been developed in response to the present state of the art, and in particular, in response to the problems and needs in the art that have not yet been fully solved by currently available power-on password management methods. Accordingly, the present invention has been developed to provide an apparatus, system, and method for selectively enabling a power-on password that overcome many or all of the above-discussed shortcomings in the art.

The apparatus to selectively enable a power-on password is provided with a plurality of modules configured to functionally execute the steps of storing the power-on password, determining if a power-on policy is satisfied, and granting access to a blade server. These modules in the described embodiments include a password module, a test module, and an access module.

The password module stores the power-on password for the blade server. The test module determines if a power-on policy is satisfied. The access module grants access to the blade server if the power-on policy is not satisfied. If the power-on policy is satisfied, the access module denies access to the blade server until the power-on password is received. In one embodiment, the power-on policy is satisfied if the blade server is removed from a first blade enclosure and inserted in a second blade enclosure. The apparatus selectively enables the power-on password so that power-on password is not required unless the power-on policy is satisfied.

A system of the present invention is also presented to selectively enable a power-on password. The system may be embodied in a blade system. In particular, the system, in one embodiment, includes a first blade enclosure and a first blade server.

The first blade enclosure may receive a plurality of blade servers including the first blade server. The first blade server performs data processing operations and includes a password module, a test module, and an access module.

The password module stores the power-on password for the first blade server. The test module determines if a power-on policy is satisfied. The access module grants access to the first blade server if the power-on policy is not satisfied. If the power-on policy is satisfied, the access module denies access to the first blade server until the power-on password is received. The system selectively disables the power-on password unless the power-on policy is satisfied.

A method of the present invention is also presented for selectively enabling a power-on password. The method in the disclosed embodiments substantially includes the steps to carry out the functions presented above with respect to the operation of the described apparatus and system. In one embodiment, the method includes storing the power-on password, determining if a power-on policy is satisfied, and granting access to a blade server.

A password module stores a power-on password for a blade server. A test module determines if a power-on policy is satisfied. An access module grants access to the blade server if the power-on policy is not satisfied. If the power-on policy is satisfied, the access module denies access to the blade server until the power-on password is received. The method selectively enables the power-on password to protect the blade server's data while simplifying blade server management.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention selectively enables a power-on password for a blade server if a power-on policy is satisfied. In addition, the present invention protects the blade server's data while simplifying blade server management. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
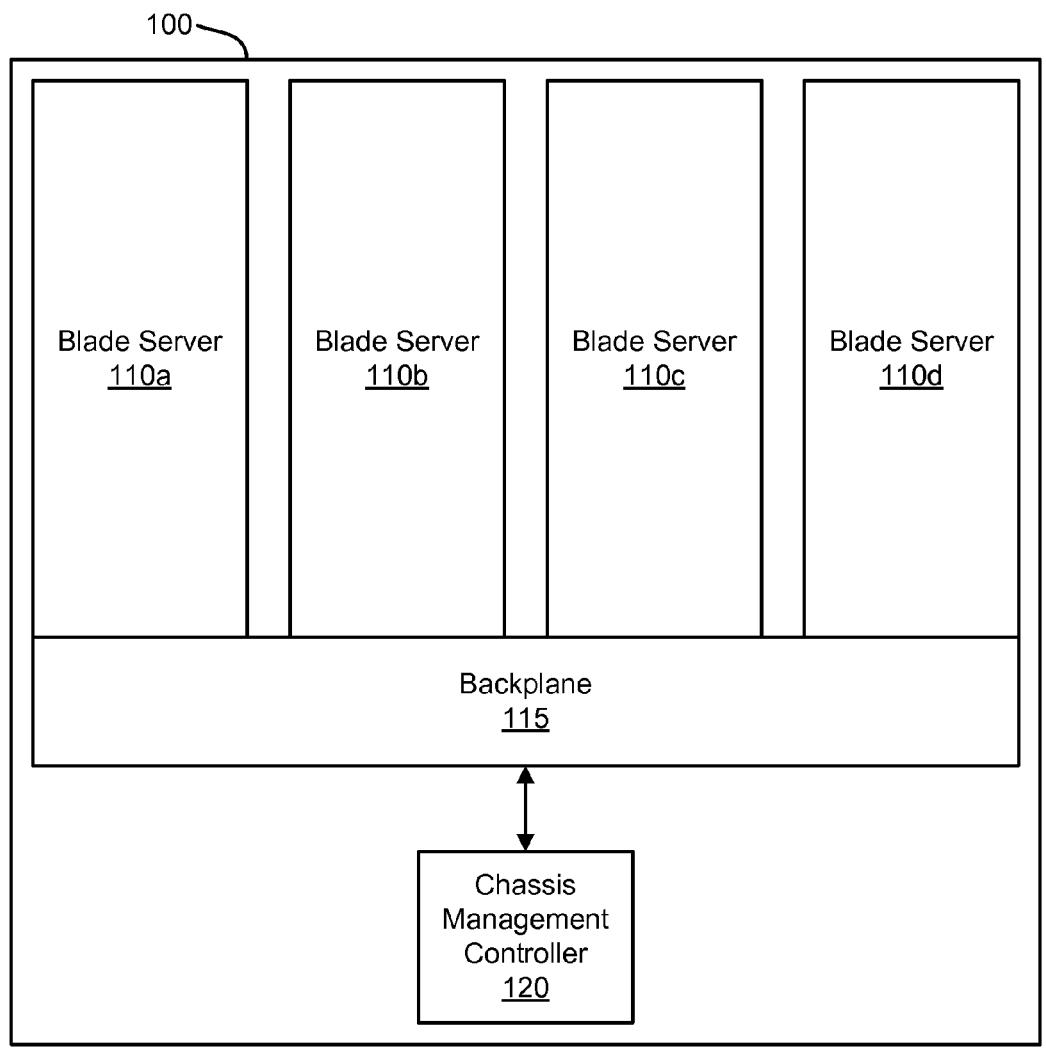
FIG. 1 is a schematic block diagram illustrating one embodiment of a blade enclosure in accordance with the present invention.

FIG. 1 is a schematic block diagram illustrating one embodiment of a blade enclosure 100 in accordance with the present invention. The blade enclosure 100 includes one or more blade servers 110, a backplane 115, and a chassis management controller 120.

The blade servers 110 are configured as servers as will be described hereafter. The blade servers 110 connect to the backplane 115. The backplane 115 may provide electric power to the blade servers 110, one or more communications interfaces, a storage interface, and the like. For example, the backplane 115 may provide an Ethernet connection, a Fibre Channel storage connection, a dedicated bus connection, and the like to each blade server 110.

The blade servers 110 may be configured as circuit cards, circuit modules, and the like. In one embodiment, the blade servers 110 are hot swappable. Each blade server 110 may be quickly inserted into and/or removed from the blade enclosure 100.

The chassis management controller 120 may manage the blade servers 110 within the blade enclosure 100. For example, when a blade server 110 is inserted into the blade enclosure 100, the chassis management controller 120 may establish communications with the blade server 110.

In addition, the chassis management controller 120 may determine the identity and configuration of the blade server 110 by querying the blade server 110. For example, the chassis management controller 120 may query the blade server 110 for the operating system that is installed on the blade server 110, the amount of memory available on the blade server 110, the number and organization of processors on the blade server 110, and the like.

The chassis management controller 120 may also configure the blade server 110 for operation in the blade enclosure 100. For example, the chassis management controller 120 may provide the blade server 110 with an address such as a world wide name (WWN) that identifies the blade server 110 to a Fibre Channel network, an internet protocol (IP) address that identifies the blade server 110 to a network, or the like.

Figure 2:
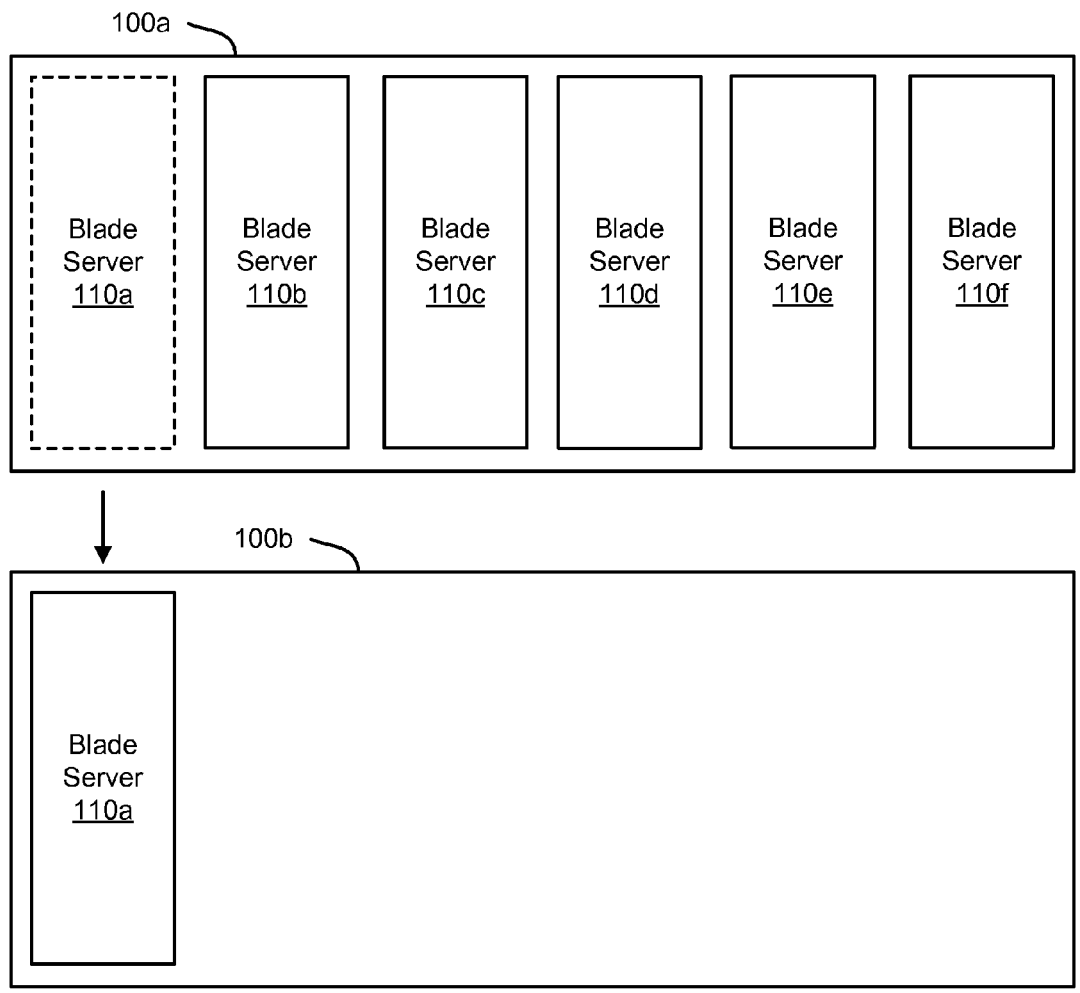
FIG. 2 is a schematic block diagram illustrating one embodiment of blade enclosures in accordance with the present invention.

FIG. 2 is a schematic block diagram illustrating one embodiment of blade enclosures 100 in accordance with the present invention. The description of the blade enclosures 100 refers to elements of FIG. 1, like numbers referring to like elements. Two blade enclosures 100a, 100b are shown. A first blade enclosure 100a may be the blade enclosure 100a of FIG. 1. The first blade enclosure 100a includes a plurality of blade servers 110. For simplicity, only the blade servers 110 of the blade enclosures 100 are shown.

A first blade server 110a may be removed from the first blade enclosure 100a and installed in the second blade enclosure 110b. In the past, if a malicious user moved the first blade server 110a from the first blade enclosure 100a to the second enclosure 110b, the malicious user could access proprietary data stored on the first blade server 110a. For example, the malicious user may direct the first blade server 110a to retrieve access codes, data, and the like stored on a hard disk drive of the first blade server 110a.

The present invention selectively enables a power-on password for the blade servers 110 as will be described hereafter. Thus the first blade server 110a requires a power-on password when powered on in a potentially compromising environment such as the second blade enclosure 110b while second through sixth blades servers 110b-110f may not require a power-on password because the second through sixth blades servers 110b-110f remain in the uncompromised first blade enclosure 100a.

Figure 3:
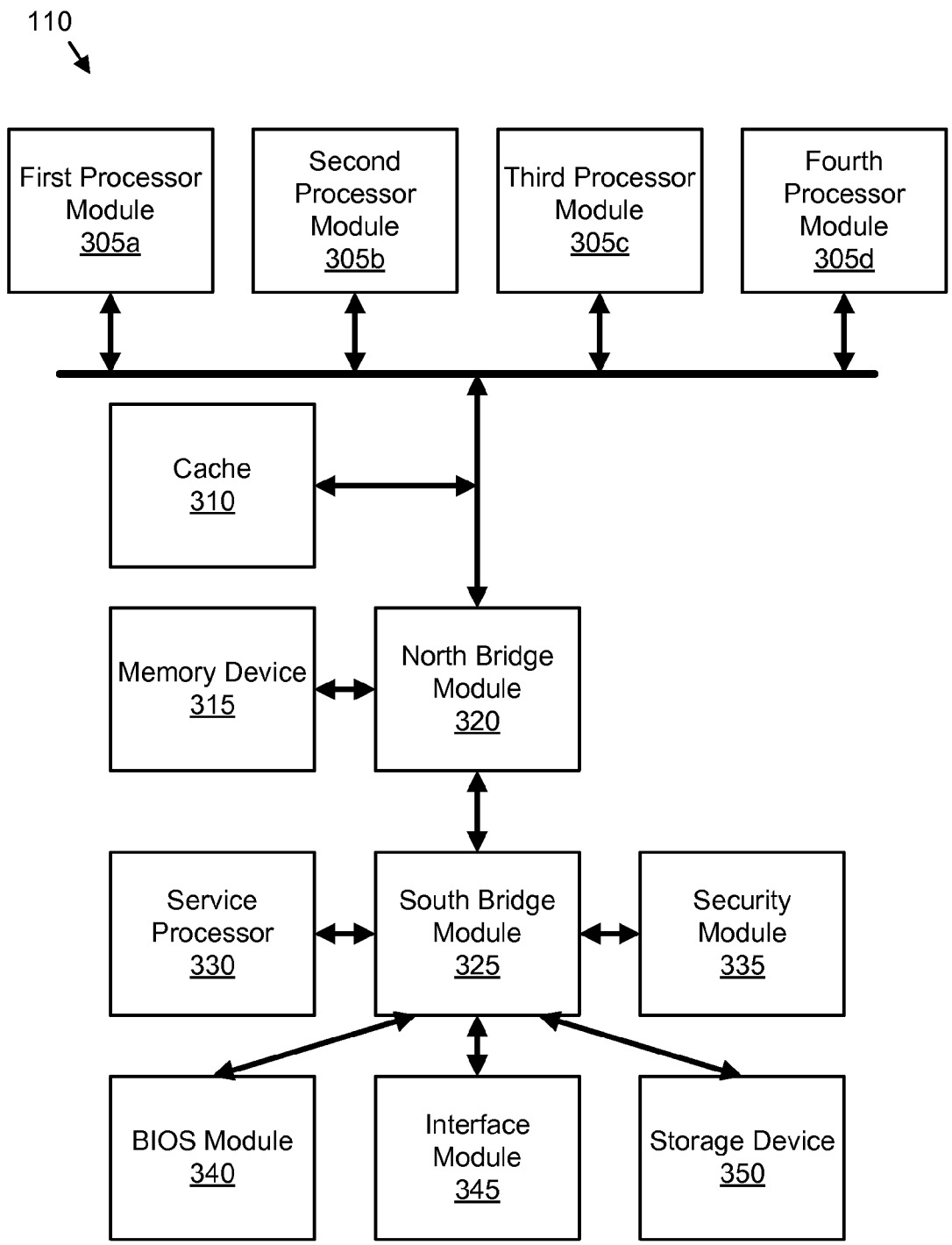
FIG. 3 is a schematic block diagram illustrating one embodiment of a blade server of the present invention.

FIG. 3 is a schematic block diagram illustrating one embodiment of a blade server 110 of the present invention. The blade server 110 includes one or more processor modules 305, a cache module 310, a memory device 315, a north bridge module 320, a south bridge module 325, a service processor 330, a security module 335, a basic input/output system ("BIOS") module 340, an interface module 345, and a storage device 350.

The processor modules 305, cache module 310, memory device 315, north bridge module 320, south bridge module 325, service processor 330, security module 335, BIOS module 340, and interface module 345, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory device 315 stores software instructions and data including computer readable programs. The cache 310 may store the software instructions and data with lower latency than the memory device 315 while maintaining coherency of the software instructions and data with the memory device 315. The processor modules 305 execute the software instructions and manipulate the data as is well know to those skilled in the art.

The north bridge module 320 and the south bridge module 325 provide communications between the processor modules 305, the cache 310, the memory device 315, the service processor 330, the security module 335, the BIOS module 340, the interface module 345, and the storage device 350. For example, the processor modules 305 may store software instructions and data on the storage device 350 through the north bridge module 320 and the south bridge module 325.

The storage device 350 may be a hard disk drive, an optical storage device, a holographic storage device, a micromechanical storage device, or the like. The BIOS module 340 may include non-volatile memory. The non-volatile memory of the BIOS module 340 may store software instructions comprising one or more computer programs that initialize the blade server 110 and load an operating system.

The blade server 110 may connect to the backplane 115 of a blade enclosure 100 through the interface module 345. The interface module 345 may include connections for electric power, connections to a network, connections to a storage subsystem, connections to a data bus, and the like. In one embodiment, the interface module 345 includes connections to the chassis management controller 120.

The security module 335 may securely store encrypted data. In one embodiment, the security module 335 comprises a non-volatile memory. The security module 335 may also include logic that only allows authorized processes to access the encrypted data. In one embodiment, the security module 335 is configured as a Trusted Platform Module (TPM) as defined by the Trusted Computing Group.

The service processor 330 provides management services for the blade server 110. For example, the service processor 330 may communicate with the chassis management controller 120 to configure the blade server 110 to operate in the blade enclosure 100. In addition, the service processor 330 may perform load management tasks, power management tasks, and the like.

Figure 4:
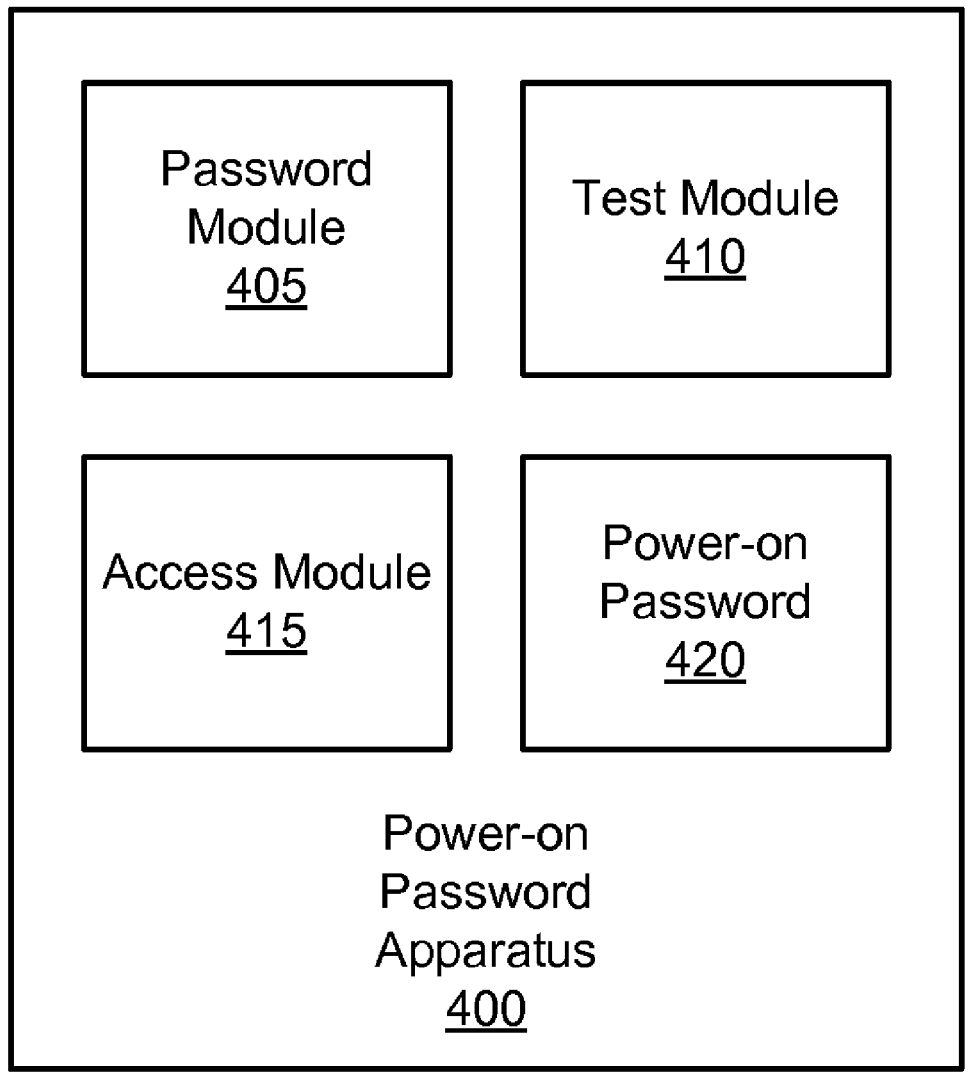
FIG. 4 is a schematic block diagram illustrating one embodiment of a power-on password apparatus of the present invention.

FIG. 4 is a schematic block diagram illustrating one embodiment of a power-on password apparatus 400 of the present invention. The apparatus 400 includes a password module 405, a test module 410, an access module 415, and a power-on password 420. The description of the apparatus 400 refers to elements of FIGS. 1-3, like numbers referring to like elements.

The power-on password 420 may be a random number. Alternatively, the power-on password 420 may be a string of alphanumeric characters. The power-on password 420 may be stored to the blade server 110 when the blade server 110 is manufactured. For example, as part of the blade server manufacturing processor, an electronic device tester may store the power-on password 420 to the blade server 110.

The power-on password 420 may be a default password. For example, all blade servers 110 may be manufactured with the default password as the power-on password 420. Alternatively, the power-on password 420 may be well known. For example, all administrators may be informed of the power-on password 420.

In an alternate embodiment, the chassis management controller 120 generates the power-on password 420. For example, the chassis management controller 120 may generate a random number and store the random number to the blade server 110 as the power-on password 420 when the blade server 110 is initially installed in the blade enclosure 100. Thereafter, the blade server 110 may only accept new power-on passwords 420 if the original power-on password 420 is also supplied.

In another embodiment, the blade server 110 generates the power-on password 420. For example, the security module 335 may include a random number generator and generate the power-on password 420. The blade server 110 may communicate the power-on password 420 to the chassis management controller 120 when the blade server 110 is initially installed in a blade enclosure 100. Subsequently, the blade server 110 may not communicate the power-on password 420 when installed in a blade enclosure 100.

In one embodiment, an administrator communicates the power-on password 420 to the blade server 110. For example, the administrator who initially installs the blade server 110 may create the power-on password 420 and store the power-on password 420 to the blade server 110 by communicating with the blade server 110 through the blade enclosure 100.

The password module 405 stores the power-on password 420 for the blade server 110. The security module 335 may embody the password module 405. For example, a TPM may store the power-on password 420 as an encrypted key in a secure memory. In an alternate embodiment, the BIOS module 340 stores the power-on password 420. The password module 405 may also store credentials and globally identifying information from a blade enclosure 100 as will be described hereafter.

The test module 410 determines if a power-on policy is satisfied. The service processor 330 may embody the test module 410. In one embodiment, the test module 410 comprises one or more computer readable programs executing on the service processor 330. The power-on policy may comprise a list of criteria. The power-on policy criteria may be stored in a file, a data array, or the like. For example, a file containing the power-on policy criteria may be stored to the blade server 110 when the blade server 110 is manufactured. The power-on policy file may be stored in the BIOS module 340, the security module 335, and/or the storage device 350.

In one embodiment, the chassis management controller 120 configures the power-on policy when the blade server 110 is initially installed in a blade enclosure 100. Thereafter, a chassis management controller 120 may only modify the power-on policy by using the power-on password to authenticate the modifications. The administrator may direct the chassis management controller 120 to make specified modifications to the power-on policy by providing the modifications and the power-on password to the test module 410.

The power-on policy file may specify that the power-on policy is satisfied if the blade server 110 is losses power. In addition, the power-on policy file may specify that the power-on policy is not satisfied the first time the blade server 110 is powered on. In one embodiment, the power-on policy is satisfied if the blade server 110 is powered on in the second blade enclosure 110b after previously being powered on in the first blade enclosure 100a.

The access module 415 grants access to the blade server 110 if the power-on policy is not satisfied. In one embodiment, the access module 415 comprises one or more computer readable programs executing on the service processor 330. If the power-on policy is satisfied, the access module 415 denies access to the blade server 110 until the power-on password 420 is received. The apparatus 400 selectively enables the power-on password 420 so that power-on password 420 is not required unless the power-on policy is satisfied.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
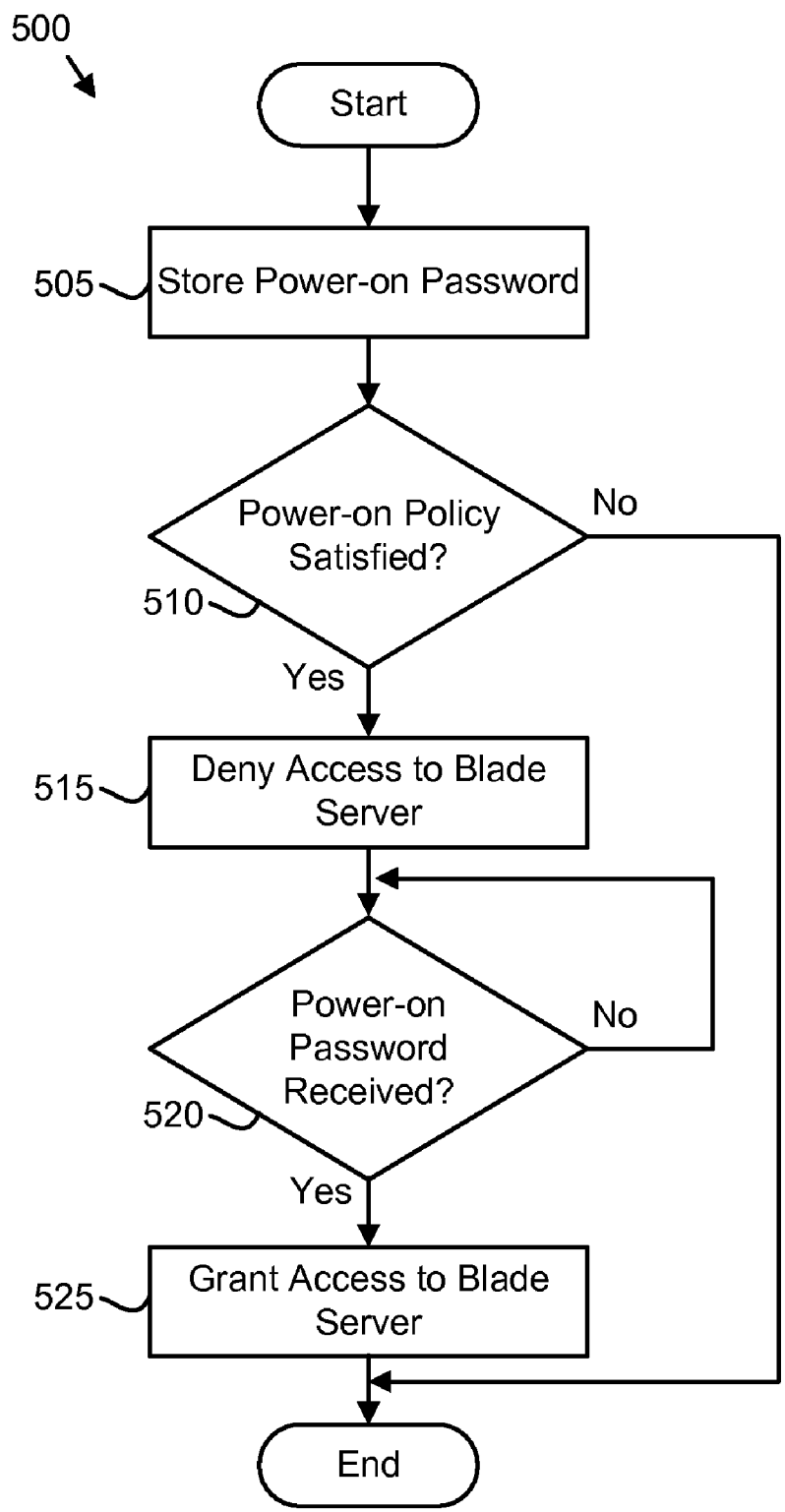
FIG. 5 is a schematic flow chart diagram illustrating one embodiment of a power-on password method of the present invention.

FIG. 5 is a schematic flow chart diagram illustrating one embodiment of a power-on password method 500 of the present invention. The method 500 substantially includes the steps to carry out the functions presented above with respect to the operation of the described apparatus and system of FIGS. 1-4. The description of the method 500 refers to elements of FIGS. 1-4, like numbers referring to like elements.

In one embodiment, the method 500 is implemented with a computer program product comprising a computer readable medium having a computer readable program. A computer such as the service processor 330, the blade server 110, and the chassis management controller 120 may execute the computer readable program.

The method 500 begins and the password module 405 stores 505 the power-on password 420 for the blade server 110. In one embodiment, the password module 405 also stores the power-on policy. The password module 405 may only allow the power-on password 420 to be modified in response to receiving the power-on password 420. Alternatively, password module 405 may allow the power-on password 420 to be modified in response to receiving an administrator password.

In one embodiment, the password module 405 only allows access to the power-on policy in response to receiving the power-on password 420, the administrator password, or the like. For example, the password module 405 may only allow the power-on policy to be modified in response to receiving the administrator password communicated from the administrator through the blade enclosure 100 to the blade server 110.

The test module 410 determines 510 if the power-on policy is satisfied as will be described hereafter for FIG. 6. In one embodiment, the test module 410 determines 510 if the power-on policy is satisfied each time the blade server 110 is powered up. For example, the test module 410 may determine 510 if the power-on policy is satisfied each time the blade server 110 is hot swapped into a blade enclosure 100 and/or each time the blade enclosure 100 and blade servers 110 are powered on.

If the test module 410 determines 510 that the power-on policy is satisfied, the access module 415 denies 515 access to the blade server 110. For example, the access module 415 may prevent the processor modules 305 of the blade server 110 from receiving tasks. In addition, the access module 415 may block access to the storage device 350 and deny modifications to the configuration of the blade server 110.

The access module 415 further determines 520 if the power-on password 420 is received. In one embodiment, the power-on password 420 is received from the chassis management controller 120. Alternatively, the administrator may communicate the power-on password 420 to the access module 415 through the blade enclosure 100. If the access module 415 determines 520 that the power-on password 420 is not received, the access module 415 loops to determine 520 if the power-on password 420 is received. Until the power-on password 420 is received, the blade server 110 may not be used and data may not be retrieved from the blade server 110. Thus any proprietary data on the blade server 110 is protected from loss. In addition, theft of the blade server 110 may be discouraged, as the blade server 110 if stolen is rendered unusable.

If the test module 410 determines 510 that the power-on policy is not satisfied and/or if the access module 415 determines 520 if the power-on password 420 is received, the access module 415 grants 525 access to the blade server 110 and the method 500 terminates. For example, the access module 415 may grant access to the blade server 110 by allowing data to be retrieved from the blade server 110, tasks to be assigned to the blade server 110, the configuration of the blade server 110 to be modified, and the like. In one embodiment, the blade server 110 may be fully useable and configurable until the blade server 110 is again powered on.

The method 500 selectively enables the power-on password 420. Thus the method 500 may disable the power-on password 420 when the blade server 110 is powered on in the first blade enclosure 100a where the blade server 110 has previously been powered on in the first blade enclosure 100a while the method 500 may enable the power-on password 420 when the blade server 110 is powered on in the second blade enclosure 100b where the blade server 110 has not previously been powered on in the second blade enclosure 100b.

Figure 6:
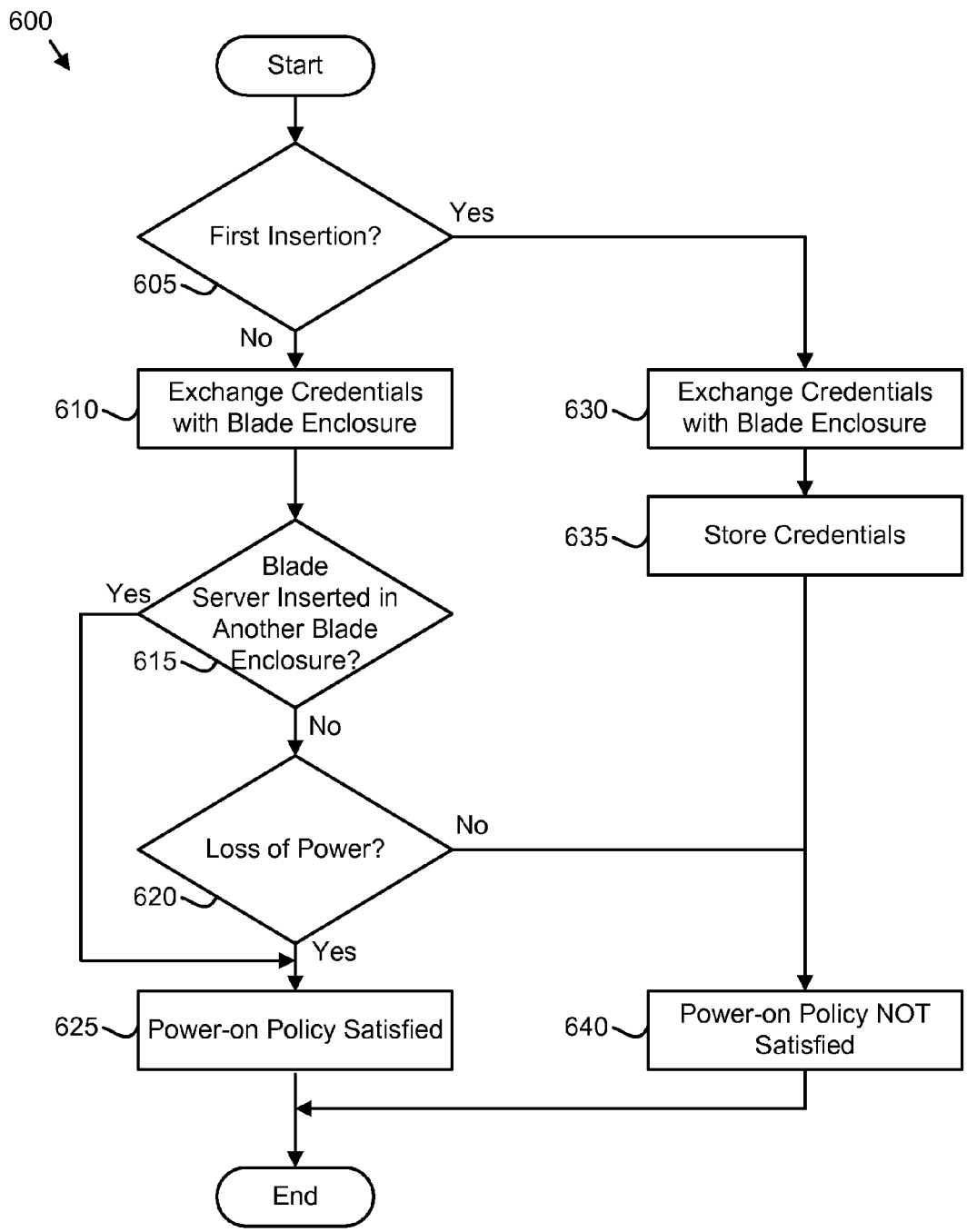
FIG. 6 is a schematic flow chart diagram illustrating one embodiment of a power-on policy method of the present invention.

FIG. 6 is a schematic flow chart diagram illustrating one embodiment of a power-on policy method of the present invention. The method 600 substantially includes the steps to carry out the functions presented above with respect to the operation of the described apparatus, system and method of FIGS. 1-5. In particular, the method 600 may embody step 510 of FIG. 5. The description of the method 600 refers to elements of FIGS. 1-5, like numbers referring to like elements.

In one embodiment, the method 600 is implemented with a computer program product comprising a computer readable medium having a computer readable program. A computer such as the service processor 330, the blade server 110, and the chassis management controller 120 may execute the computer readable program.

The method 600 begins and the test module 410 may determine 605 if the insertion of the blade server 110 is a first insertion in a first blade enclosure 100a. In one embodiment, the test module 410 determines 605 that the insertion is a first insertion if no credentials from the first blade enclosure 100a are stored in the password module 405 as will be described hereafter.

If the test module 410 determines 605 that the insertion of the blade server 110 is a first insertion, the test module 410 may exchange 630 credentials with the first blade enclosure 100a. The credentials may be a serial number, an encryption key, or the like. In one embodiment, the chassis management controller 120 communicates credentials to the service processor 330 and the test module 410 of the service processor 330 communicates credentials to the chassis management controller 120.

The test module 410 may also store other globally unique information identifying the first blade enclosure 100. For example, the test module 410 may store an IP address of the first blade enclosure 100a as globally unique information. In one embodiment, the test module 410 stores the globally unique information to the password module 405.

In one embodiment, the password module 405 stores 635 the exchanged credentials. For example, the TPM embodying the password module 405 may encrypt and store the credentials in the non-volatile memory. In addition, the test module 410 may determine 640 that the power-on policy is not satisfied as shown in the "No" branch of step 510 and the method 600 terminates.

If the test module 410 determines 605 that the insertion of the blade server 110 is not the first insertion, the test module 410 may exchange 610 credentials with the blade enclosure 100 as described for step 630. In addition, the test module 410 may determine 615 if the blade server 110 is inserted in another blade enclosure 100 that is not the first blade enclosure 110a. For example, if the blade server 110 is previously inserted in the first blade enclosure 100a, the blade server 110 is inserted in another blade enclosure 100 if the blade server 110 is inserted in the second blade enclosure 110b.

In one embodiment, the test module 410 compares the exchanged credentials of step 610 with the previously stored credentials of step 630. If the compared credentials are substantially equivalent, the test module 410 may determine 615 that the blade server 110 is not inserted in another blade enclosure 100.

In one embodiment, the test module 410 determines 615 that the blade server 110 is not inserted in another blade enclosure 100 by comparing globally unique information identifying the current blade enclosure with the globally unique information stored in step 630. Continuing the example above, the test module 410 may compare the IP address of a current blade enclosure 100 with the IP address of a last blade enclosure 100 that the blade server 110 was inserted into.

If the test module 410 determines 615 that the blade server 110 is not inserted in another blade enclosure 100, the test module 410 may determine 620 if power has been lost. In one embodiment, the test module 410 determines 620 that power has been lost if the blade server 110 has executed one or more power-on software processes such as a BIOS power-on process. If the test module 410 determines 620 that power has not been lost, the test module 410 may determine 640 that the power-on policy is not satisfied as shown in the "No" branch of step 510 and the method 600 terminates.

If the test module 410 determines 615 that the blade server 110 is inserted in another blade enclosure 100 and/or if the test module 410 determines 620 that power has been lost, the test module 410 may determine 625 that the power-on policy is satisfied as shown in the "Yes" branch of step 510 and the method 600 terminates. The method 600 may determine if the power-on policy is satisfied for step 510.

The embodiment of the present invention selectively enables the power-on password 420 for the blade server 110 if a power-on policy is satisfied. In addition, the present invention protects the blade server's data while simplifying blade server management.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to selectively enable a power-on password, the apparatus comprising:
   a password module storing a power-on password for a blade server;
   a test module determining if a power-on policy is satisfied in response to the blade server receiving power, wherein the power-on policy is satisfied when the blade server is inserted into a blade enclosure different than a previous blade enclosure that the blade server was last inserted into and wherein the power-on policy is satisfied if the blade server is removed from a first blade enclosure and inserted in a second blade enclosure, wherein the test module exchanges credentials with the second blade enclosure and determines that the blade server is inserted in the second blade enclosure by comparing the exchanged credentials with stored credentials from the first blade enclosure; and
   an access module granting access to the blade server when the power-on policy is not satisfied, and denying access to the blade server until the power-on password is received when the power-on policy is satisfied, wherein all or a portion of the password module, the test module, and the access module comprise one or more of logic hardware and executable code, the executable code stored on one or more computer readable storage media and executed by a processor.

2. The apparatus of claim 1, wherein the test module stores globally unique information identifying the first blade enclosure and compares the stored globally unique information with globally unique information identifying the second blade enclosure.

3. The apparatus of claim 1, wherein the power-on policy is satisfied if the blade server loses power.

4. The apparatus of claim 1, wherein the power-on policy is not satisfied a first time the blade server is powered on.

5. The apparatus of claim 1, wherein the power-on password is communicated to the password module by a chassis management controller of the blade enclosure.

6. The apparatus of claim 5, wherein an administrator provides the power-on password to the chassis management controller.

7. The apparatus of claim 1, wherein a manufacturer writes a power-on password to the password module wherein the power-on password is selected from a default power-on password and a well-known power-on password.

8. A computer program product comprising a computer useable storage medium having a computer readable program, wherein the computer readable program when executed on a computer causes the computer to:
  store a power-on password for a blade server;
  determine if a power-on policy is satisfied in response to the blade server receiving power, wherein the power-on policy is satisfied when the blade server is inserted into a blade enclosure different than a previous blade enclosure that the blade server was last inserted into and wherein the power-on policy is satisfied if the blade server is removed from a first blade enclosure and inserted in a second blade enclosure, wherein removal of the blade server from the first blade enclosure and insertion in the second blade enclosure is determined by comparing credentials exchanged between the blade server and the second blade enclosure with stored credentials from the first blade enclosure; and
  grant access to the blade server when the power-on policy is not satisfied, and deny access to the blade server until the power-on password is received when the power-on policy is satisfied.

9. The computer program product of claim 8, wherein the computer readable code further causes the computer to store globally unique information identifying the first blade enclosure and compares the stored globally unique information with globally unique information identifying the second blade enclosure.

10. The computer program product of claim 8, wherein the power-on policy is satisfied if the blade server loses power.

11. The computer program product of claim 8, wherein the power-on policy is not satisfied a first time the blade server is powered on.

12. A system to selectively enable a power-on password, the system comprising:
  a first blade enclosure receiving a plurality of blade servers;
  a first blade server of the plurality of blade servers, the first blade server performing data processing operations and comprising a password module storing a power-on password;
  a test module determining if a power-on policy is satisfied in response to the blade server receiving power, wherein the power-on policy is satisfied when the blade server is inserted into a blade enclosure different than a previous blade enclosure that the blade server was last inserted into and wherein the power-on policy is satisfied if the blade server is removed from a first blade enclosure and inserted in a second blade enclosure, wherein the test module exchanges credentials with the second blade enclosure and determines that the blade server is inserted in the second blade enclosure by comparing the exchanged credentials with stored credentials from the first blade enclosure; and
  an access module granting access to the blade server when the power-on policy is not satisfied, and denying access to the blade server until the power-on password is received when the power-on policy is satisfied.

13. The system of claim 12, wherein the test module stores globally unique information identifying the first blade enclosure and compares the stored globally unique information with globally unique information identifying the second blade enclosure.

14. A method for deploying computer infrastructure, comprising integrating computer-readable code into a computing system, wherein the code in combination with the computing system is capable of performing the following:
  storing a power-on password for a blade server;
  storing credentials exchanged between the blade server and a first blade enclosure;
  determining if a power-on policy is satisfied in response to the blade server receiving power, wherein the power-on policy is satisfied when the blade server is inserted into a blade enclosure different than a previous blade enclosure that the blade server was last inserted into and wherein the power-on policy is satisfied if the blade server is removed from the first blade enclosure and inserted in a second blade enclosure wherein removal of the blade server from the first blade enclosure and insertion in the second blade enclosure is determined by comparing credentials exchanged between the blade server and the second blade enclosure with the stored credentials; and
  granting access to the blade server when the blade server is not removed from the first blade enclosure and inserted in the second blade enclosure such that the power-on policy is not satisfied, and denying access to the blade server until the power-on password is received when the blade server is removed from the first blade enclosure and inserted in the second blade enclosure such that the power-on policy is satisfied.

* * * * *